Jan. 3, 1961     C. M. SMITH     2,967,286

WIRING DEVICE

Filed Sept. 18, 1956

WITNESSES
Robert C. Baird
Leon M. Garman

INVENTOR
Clarence M. Smith.
BY Arthur T. Stratton
ATTORNEY

United States Patent Office 2,967,286
Patented Jan. 3, 1961

2,967,286
WIRING DEVICE

Clarence M. Smith, Trumbull, Conn., assignor to The Bryant Electric Company, Bridgeport, Conn., a corporation of Connecticut Filed Sept. 18, 1956, Ser. No. 610,520

5 Claims. (Cl. 339—103)

This invention relates generally to electrical wiring devices, and more particularly to terminal structures for such devices, and to the cooperation of such terminal structures and other elements of a wiring device.

Electrical wiring devices include a number of electrical conducting parts, such as contacts, terminals and the like, which are usually assembled within a casing of insulating material, and some means is provided for attaching electrical conductors to the terminals of the device.

Attempts have been made in the past to reduce the cost of assembly of these devices by arranging all of the parts so that they may simply be laid into the casing through an open side thereof, and held in position by securing a cover or the like over the open side of the casing. However, in certain instances it is desirable to assemble electrical lead conductors with the wiring device in the course of manufacture of the device, and attempts to assemble the conductors by a similar laying-in method have given rise to difficulties in obtaining adequate electrical contact between the conductors and their terminals, and to difficulties in providing adequate provision to relieve outside strains on the conductors so that electrical contact between the conductors and their terminals is not impaired or interrupted altogether.

Accordingly, one object of this invention is to provide a novel construction of wiring device which will permit assembly of the parts, including electrical lead conductors by merely laying or forcing them into a casing of insulating material so that they are adequately retained in operative position by securing a cover to the casing.

Another object of this invention is to provide a unique construction of a wiring device terminal and its support such that upon mere insertion of the terminal and conductor into a suitable recess in the support, good electrical contact between the conductor and terminal is automatically obtained, as well as relief of the electrical contacting portions from outside strains imposed on the conductor.

A further object of this invention is to provide a novel wiring device construction having a recessed support to which parts may be assembled by insertion into the recesses, and arranged so that a lead-in conductor having a resilient covering may be assembled with a terminal so that a stripped end portion of the conductor is automatically held in good electrical contact with the terminal, and an adjacent portion of the conductor covering is held under stress to thus relieve outside strains imposed on the conductor.

These and other objects of this invention will become more apparent upon consideration of the following detailed description of preferred embodiments thereof, when taken in connection with the attached drawing, in which.

Figure 1:
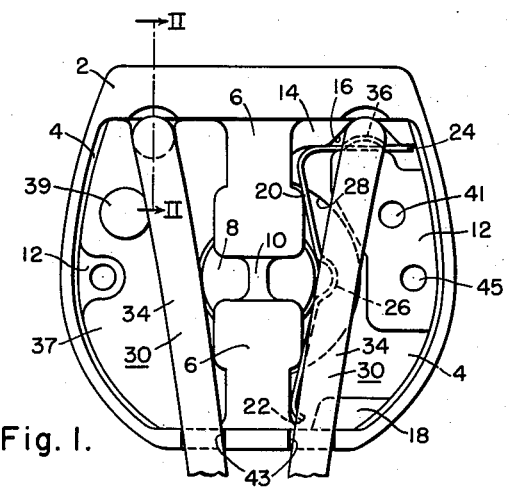
Figure 1 is a plan view of a wiring device constructed in accordance with this invention, with one of its covers removed.

While this invention may be employed with various types of wiring devices, it is illustrated on the drawing as being incorporated in one type of a holder for fluorescent lamps. This particular lamp holder has a base formed of insulating material, preferably a molded insulating material, such as a synthetic resin, and has formed on one side a pair of elongated recesses 4 which are separated by a central partition comprising relatively thick end sections 6 which are connected at their adjacent inner ends by a central circular section 8 having an outer web 10 connecting the outer ends of the partition portions 6.

Each of the recesses 4 has an intermediate abutment 12 formed integral with the base 2 and with the outer side wall of each recess, with its inner side being spaced from the central partition. Each recess is also provided with an end abutment 14 at the upper end of the recess as viewed in Fig. 1, which is also formed integral with the base 2 and with the adjacent end and side walls thereof. Each of the end abutments 14 has a surface adjacent the intermediate abutment 12 in opposition to an end surface of the intermediate abutment 12, and this surface is provided with a groove or recess 16 directly opposed to the adjacent end surface of the intermediate abutment 12. The other end of each of the recesses 4 is provided with an end abutment 18 also formed integral with the base 2 and the adjacent end and side walls thereof, and this abutment has a surface opposed to but spaced from the adjacent central partition portion 6, for a purpose to be described. All of the abutments 12, 14 and 18 have their outermost surfaces terminating in the same plane, and this plane is spaced somewhat below the outer edges of the side walls of the recesses 4.

Each of the recesses 4 is adapted to contain an elongated contact member in the form of an elongated strip of good electrical conducting material which also has the property of being resilient, such as an alloy of copper. One end 22 of the contact 20 may be slightly bent laterally and is adapted to be located in the space between the end of abutment 18 and the adjacent central partition portion 6. The other end of the contact 20 is angularly bent to extend between the spaced opposed surfaces of the abutments 12 and 14. It will be noted that there is just sufficient space between the opposed surfaces of abutments 12 and 14 to receive the angularly bent end 24 of the contact 20. The main body of the contact 20 may be somewhat V shaped, with a curved offset portion 26 being formed at substantially the mid-point of the contact 20 for receiving a cooperating male contact pin or the like.

In the form of lamp holder illustrated herein, contact pins on a fluorescent lamp are adapted to be inserted from the rear of the lamp holder as viewed in Fig. 1, and for this purpose the lamp holder is provided with openings 28 at each side of the central partition members 6, 8 and 10 which extend through the base 2 and preferably are arcuate in form as illustrated. It will be observed that the ends of each contact 20 are located against undue movement in at least two directions. Endwise movement of the contact 20 is obviously prevented by reception of the angularly bent end 24 relatively closely between the opposed surfaces of the abutments 12 and 14. Similarly, lateral movement of the contact 20 is limited on the one hand by engagement of the outer end of the angularly bent end 24 with the outer side wall of its recess 4, and on the other hand by engagement of the contact 20 with end partition portions 6. This permits insertion of the contact pins at the end of a fluorescent lamp through the openings 28 and into engagement with the inner surfaces of the contacts 20, and upon rotation of the lamp the intermediate part of each contact 20 will be stressed outwardly until the pins are rotated into engagement with the intermediate contact receiving portions 26. During such an operation, the contacts will be resiliently flexed, and it will be observed that sufficient clearance between the central partition portions 6, 8 and 10 on the one hand, and the intermediate abutment 12 on the other hand, is provided to permit substantial flexing movement.

In the description of the wiring device constructed in accordance with this invention thus far, it will be observed that in effect an open sided casing is provided for the device, having recesses formed to receive contact members having integral terminal portions 24, by merely inserting the contact members edgewise into the recesses provided in the casing. An important feature of this invention relates to the formation of the casing and terminal portions of the contacts 20 so that an electrical lead conductor may be associated therewith and assembled in good electrical conducting relation by this same action of inserting the contacts into the casing, while at the same time providing a way to relieve the contacting parts of the conductor and terminal part of the contact from strains exerted on exterior portions of the conductors. In accordance with this invention, electrical lead conductors 30 are provided, comprising a wire 32, herein illustratively shown as a stranded type of conductor of good electrical conducting material, such as copper. The wire 32 is provided with an insulating covering 34, preferably of an insulating material which has resilient properties, such as rubber.

In assembling the conductors 30 with the terminal portions 24 of the contacts 20, a predetermined amount of the conductor covering 34 is removed from the end of each conductor in an amount sufficient that the bare end portion of the wire 32 will be sufficient to span the width of each terminal portion 24 at one side thereof, and preferably to extend across one edge. When the wire is placed as indicated above, the remainder of the conductor is then reversely bent to extend along the opposite side of its terminal portion 24, and this side has the covering 34 in engagement with this opposite side of its terminal portion 24.

Figure 2:
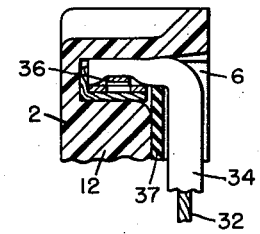
Fig. 2 is a partial sectional view of the wiring device shown in Fig. 1, taken substantially along the line II—II thereof.
Figure 3:
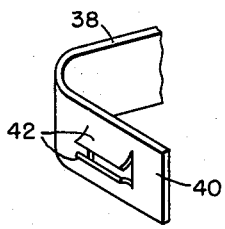
Fig. 3 is a perspective view of the terminal end of a modified form of contact member suitable for use with the wiring device shown in Figs. 1 and 2.

After the conductor has been wrapped about a terminal portion 24 in the manner pointed out above then the contact is inserted into the base 2. It will be noted that the groove 16 in the end abutment 14 is positioned to receive the covered part of the conductor where it engages a terminal portion 24, and preferably the clearance between the opposed surfaces of intermediate abutment 12 and the groove 16 is somewhat less than the combined thickness of wire 32, its covering 34 and the thickness of the terminal portion 24. Accordingly, when the terminal portion 24 is forced into the position illustrated in Figs. 1 and 2, the bare portion of wire 32 will be forced into intimate engagement with the adjacent side of the terminal portion 24, and even deformed somewhat, while the covering 34 of the conductor at the opposite side of the terminal portion 24 will be forced into intimate frictional engagement with the opposite side of the terminal portion 24. In order to enhance the grip on the conductor covering 34, the terminal portion 24 of each of the contacts 20 is preferably provided with an integral outwardly lanced portion 36 of limited area which presents spaced side edges extending generally longitudinally of the terminal portion 24 and transversely of the conductor to further compress the part of the conductor covering 34 which is engaged by the projection 36, and to become imbedded therein to a degree.

After the contacts 20 and their conductors have been assembled in the base 2 in the manner indicated above, a cover 37 for each of the recesses 4 is secured and placed, for example, by a drive screw 39 or the like, adapted to threadedly engage an opening 41 in the intermediate abutments 12. The covers 37 seat on the outer surfaces of the abutments 12, 14 and 18 in the manner illustrated. The conductors then extend along the respective covers and through notches 43 provided in the end wall of each of the recesses 4. As indicated, each of the intermediate abutments 12 may be provided with an opening 45, and each of the covers has a cut-out portion about such openings, so that a mounting screw or the like may be extended through the openings 45 to mount this particular design of lamp holder on a suitable support. It will be observed that the abutments 12, 14 and 18 are located sufficiently inwardly of the outer edges of the recesses 4 that when the covers 37 are mounted thereon, there is still sufficient clearance left for the conductors to extend along the outside of the covers and through the notches 43 so that this lamp holder can be mounted flush against a support.

It can now be observed that the electrical connections of the conductors to the terminal portions of the contact members in this particular device are made by simply first assembling the conductors and terminals in the manner indicated, and then inserting them in the suitably formed recesses in the base. The assembly is thus completed and provides an engagement of a conductor wire 32 with a terminal portion 24 to provide good electrical contact therebetween, while at the same time stressing a portion of the resilient conductor covering 34. Escape of the contacts is then prevented merely by mounting the cover members 37 in place and securing them, as by screws 39. There is thus provided, by engagement of a projection 36 with the conductor covering 34, a point of resistance to stresses exerted on the outer portions of the conductors 30 to relieve the engagement of wire 32 and terminal portion 24 from any such stress. This action is also enhanced by reversely bending the conductor about its terminal portion 24 so that any stress on the conductors 30 outwardly of the wiring device will actually tend to move the terminal portion 24 into firmer engagement with the bare end of conductor wire 32 while tending to move the entire terminal portion 24 and contact 20 out of its recess 4, which movement is prevented by the cover 37 for the recess. In addition, any outward movement is resisted by the frictional engagement of the conductor covering 34 in the base of groove 16, while relative movement between the conductor and terminal portion 24 is prevented by engagement of the edges of projection 36 being imbedded in the covering 34 for the conductor 30.

The particular form of projection on the terminal part of the contact or other terminal for a wiring device may take several forms as indicated in Figs. 3 to 7. Thus, in Fig. 3 there is illustrated a contact 38 having an angularly bent terminal portion 40 which has a pair of opposed elongated outwardly struck tab portions 42. These will obviously engage the covering 34 of the conductor in the same way as projection 36 illustrated in Figs. 1 and 2, and will similarly provide a pair of edge portions which can become imbedded in the covering 34 upon insertion of the contact 38 with a conductor 30 assembled therewith in the same manner and in the same type of recess described above and illustrated in Figs. 1 and 2.

Figure 4:
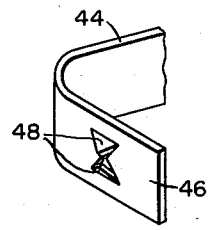
Fig. 4 is another modified form of the terminal end of a contact member.

Likewise, Fig. 4 illustrates a further modified form of projection comprising a pair of opposed substantially triangularly shaped integral tabs 48, struck out of the terminal portion 46 of a contact 44. Thus, projections 48 will provide relatively sharp points which can become more readily imbedded in a conductor covering 34, but which may be somewhat more difficult to line up with an inserted conductor.

Figure 5:
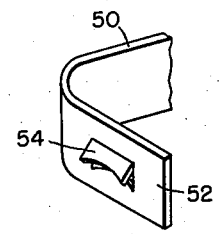
Fig. 5 is a still further modified form of the terminal end of a contact member.

In Fig. 5 there is illustrated a contact 50 having an angularly bent terminal portion 52 having a single projection 54 integral therewith, and formed by striking out a part of the material of the terminal portion 52, with the outer edge of the projection 54 longitudinally concave to more readily conform to the shape of the conductor covering 34, but nevertheless presenting an edge portion which can become imbedded in the covering in the same manner as the projections previously described.

Figure 6:
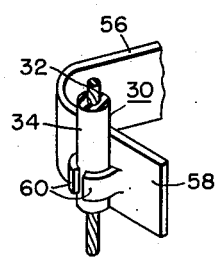
Fig. 6 is still another form of the terminal end of a contact member.

In Fig. 6 a different arrangement is illustrated wherein a contact 56 having an angularly bent terminal portion 58 has integral arcuate opposed tabs struck out from the material from the terminal portion and extending toward each other to receive a conductor 30 between them. With this type of terminal construction, when the conductor including its insulating covering 34 is inserted between tabs 60, and then the bare end of wire 32 is reversely bent about the terminal portion 58, and inserted in a recess similar to the contact recess provided in base 2, the tabs 60 themselves will be deformed to thus deform the conductor covering 34 and to become imbedded therein to provide a particularly effective connection therebetween.

Figure 7:
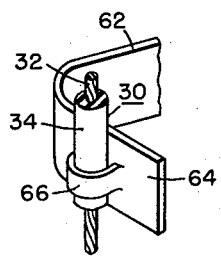
Fig. 7 represents a further modification of the terminal end of the contact member also suitable for use with the wiring device shown in Figs. 1 and 2.

The form of terminal portion 64 illustrated in Fig. 7 of the drawing is similar to that of Fig. 6, except that the struck out portion of the terminal portion 64 is in the form of a single continuous projection 66 of arcuate form for receiving a conductor 30. The terminal portion 64 is formed angularly at one end of a contact 62, and when this is inserted in a recess structure similar to that previously described in connection with Figs. 1 and 2, with a conductor assembled therewith, the projection 66 will be deformed to thus deform the conductor covering 34 and become imbedded therein to form an effective gripping engagement therebetween.

In accordance with the patent statutes the invention has been described herein as embodied in a particular form of wiring device, and as being effective with several types of terminal constructions. However, it is to be understood that the invention is not limited to such a particular device or forms of terminal, but may be used with many other types of electrical wiring devices, or other forms of terminal constructions, such as terminals which are separate from and independent of electrical contacts. Accordingly, it is desired that the invention be interpreted as broadly as possible in accordance with the following claims.

I claim as my invention:

1. A wiring device comprising, a support of insulating material, at least one recess in one side of said support shaped to receive an electrical contact, an electrical conductor having a covering of insulating material and a bare end portion, an electrical contact member having a terminal portion in said recess, the bare end of said conductor being of sufficient length to be substantially coextensive with at least one side of said terminal portion and with the conductor being reversely bent around the inner edge of the terminal portion with the covered portion extending along the opposite side of the terminal portion to emerge from said recess and then being bent substantially laterally across the outer edge of said terminal portion, the width of the portion of the recess in which said terminal portion is received being greater than the thickness of said terminal portion but less than the combined thickness of the terminal portion and conductor wrapped therearound, so that insertion of the wrapped terminal portion into said recess results in pressure being applied to the bare end of the conductor and its adjacent covering to provide good electrical contact between the conductor and terminal portion, and projecting means on said terminal portion for relieving the bare end portion of said conductor from external forces on the conductor, the last mentioned and lateral bend in said conductor with its covering being spaced from the terminal projecting means to an extent which enables said conductor with its covering to be urged at least against said projecting means in response to external forces, and means for preventing removal of the electrical contact from the recess in said support.

2. A wiring device comprising, a support of insulating material, at least one recess in one side of said support shaped to receive an electrical contact, an electrical conductor having a covering of insulating material and a bare end portion, an electrical contact member having a terminal portion in said recess, the bare end of said conductor being of sufficient length to be sufficiently coextensive with at least one side of said terminal portion and with the conductor being reversely bent around the inner edge of the terminal portion with the covered portion extending along the opposite side of the terminal portion, the width of the portion of the recess in which said terminal portion is received being greater than the thickness of the terminal portion but less than the combined thickness of the terminal portion and conductor wrapped therearound, so that insertion of the wrapped terminal portion into said recess results in pressure being applied to the bare end of the conductor and its adjacent covering to provide good electrical contact between the conductor and terminal portion, the side of said terminal portion contacting the covered portion of said conductor having a pair of spaced limited area projecting portions positioned to engage the wire covering to deform a portion of the latter during insertion, said conductor with said covered portion emerging from said recess and then being bent substantially laterally across the outer edge of said terminal portion, the last mentioned bend in said conductor with its covering being spaced from the terminal projecting portions to an extent which enables said conductor with its covering to be urged at least against said projecting portions in response to external forces, the material of said wire covering adjacent said deformed wire covering portion providing forces in response to external forces on the conductor thereby considerably to relieve said conductor bare end portion of strain which would otherwise result and to provide the described strain relief without biting into the conductor itself, and means for preventing removal of the electrical contact from the recess in said support.

3. A wiring device comprising, a support of insulating material, at least one recess in one side of said support shaped to receive an electrical contact, an electrical conductor having a covering of insulating material and a bare end portion, an electrical contact member having a terminal portion in said recess, the bare end of said conductor being of sufficient length to be sufficiently coextensive with at least one side of said terminal portion and with the conductor being reversely bent around the inner edge of the terminal portion with the covered portion extending along the opposite side of the terminal portion, the width of the portion of the recess in which said terminal portion is received being greater than the thickness of the terminal portion but less than the combined thickness of the terminal portion and conductor wrapped therearound, so that insertion of the wrapped terminal portion into said recess results in pressure being applied to the bare end of the conductor and its adjacent covering to provide good electrical contact between the conductor and terminal portion, the side of said terminal portion contacting the covered portion of said conductor having at least one deformable projection at least partially encircling the covering for said conductor so as to be deformed and imbedded in a portion of said covering during insertion, the material of said wire covering adjacent said imbedded wire covering portion providing forces in response to external forces on the conductor thereby considerably to relieve said conductor bare end portion of strain which would otherwise result and to provide the described strain relief without biting into the conductor itself, said conductor with said covered portion emerging from said recess and then being bent substantially laterally across the outer edge of said terminal portion, the last mentioned bend in said conductor with its covering being spaced from the terminal projection to an extent which enables said conductor with its covering to be urged at least against said projection in response to external forces, and means for preventing removal of the electrical contact from the recess in said support.

4. A wiring device comprising, a support of insulating material, at least one recess in one side of said support shaped to receive an electrical contact, an electrical conductor having a covering of resilient insulating material and a bare end portion, an electrical contact member having a terminal portion in said recess, the bare end of said conductor being of sufficient length to be substantially coextensive with at least one side of said terminal portion and with the conductor being reversely bent around the inner edge of the terminal portion with the covered portion extending along the opposite side of the terminal portion, the width of the portion of the recess in which said terminal portion is received being greater than the thickness of said terminal portion but less than the combined thickness of the terminal portion and conductor wrapped therearound, so that insertion of the wrapped terminal portion into said recess results in pressure being applied to the bare end of the conductor and its adjacent covering to provide good electrical contact between the conductor and terminal portion, and projecting means on said terminal portion for deforming the conductor covering and for relieving the bare end portion of said conductor from external forces on the conductor, said conductor with said covered portion emerging from said recess and then being bent substantially laterally across the outer edge of said terminal portion, the last mentioned bend in said conductor with its covering being spaced from the terminal projecting means to an extent which enables said conductor with its covering to be urged at least against said projecting means in response to external forces, and means for preventing removal of the electrical contact from the recess in said support.

5. A wiring device comprising, a support of insulating material, at least one recess in one side of said support shaped to receive an electrical contact, an electrical conductor having a covering of insulating material and a bare end portion, an electrical contact member having a terminal portion in said recess, the bare end portion of said conductor being of sufficient length to be substantially coextensive with at least one side of said terminal portion and with the conductor being reversely bent around the inner edge of the terminal portion with the covered portion extending along the opposite side of the terminal portion, the width of the portion of the recess in which said terminal portion is received being greater than the thickness of the terminal portion but less than the combined thickness of the terminal portion and conductor wrapped therearound, so that insertion of the wrapped terminal portion into said recess results in pressure being applied to the bare end of the conductor to deform the same into intimate engagement with said one side of the terminal portion to provide good electrical contact between the conductor and the terminal portion, projecting means on said terminal portion for relieving the bare end portion of said conductor from external forces on the conductor and rigid means for preventing removal of the electrical contact from the recess in said support, said conductor with said covered portion extending out of said recess and then being bent substantially laterally across the outer edge of said terminal portion, the last mentioned bend in said conductor with its covering being spaced from the terminal projecting means to an extent which enables said terminal portion to be moved pivotally in response to external forces on said conductor such that the outer edge of said terminal portion pivotally moves about the inner edge of said terminal portion to cause said one side of said terminal portion to engage more firmly said bare conductor portion.

References Cited in the file of this patent

UNITED STATES PATENTS

| | | |
|---|---|---|
| 2,292,049 | Chirelstein | Aug. 4, 1942 |
| 2,553,371 | Huppert | May 15, 1951 |
| 2,723,382 | Lawson | Nov. 8, 1955 |